US009834063B2

(12) United States Patent
Kang et al.

(10) Patent No.: US 9,834,063 B2
(45) Date of Patent: Dec. 5, 2017

(54) HEAT PUMP SYSTEM FOR VEHICLE

(71) Applicant: Halla Visteon Climate Control Corp., Daejeon (KR)

(72) Inventors: Sung Ho Kang, Daejeon (KR); Hak Kyu Kim, Daejeon (KR); Sang Ki Lee, Daejeon (KR); Jae Min Lee, Daejeon (KR); Young Ho Choi, Daejeon (KR)

(73) Assignee: HANON SYSTEMS, Daejeon-si (KR)

( * ) Notice: Subject to any disclaimer, the term of this patent is extended or adjusted under 35 U.S.C. 154(b) by 435 days.

(21) Appl. No.: 14/615,498

(22) Filed: Feb. 6, 2015

(65) Prior Publication Data
US 2015/0217625 A1 Aug. 6, 2015

(30) Foreign Application Priority Data

Feb. 6, 2014  (KR) .................. 10-2014-0013371
Jan. 30, 2015 (KR) .................. 10-2015-0014746

(51) Int. Cl.
| | |
|---|---|
| F25D 21/00 | (2006.01) |
| F25B 41/00 | (2006.01) |
| F25B 13/00 | (2006.01) |
| B60H 1/00 | (2006.01) |
| F25B 30/02 | (2006.01) |
| F25B 49/02 | (2006.01) |
| F25B 30/06 | (2006.01) |
| F25B 41/04 | (2006.01) |

(52) U.S. Cl.
CPC ..... *B60H 1/00899* (2013.01); *B60H 1/00921* (2013.01); *F25B 30/02* (2013.01); *F25B 30/06* (2013.01); *F25B 41/04* (2013.01); *F25B 49/02* (2013.01); *B60H 2001/00949* (2013.01); *F25B 2341/066* (2013.01); *F25B 2400/04* (2013.01)

(58) Field of Classification Search
CPC ............ B60H 1/00899; B60H 1/00921; F25B 2341/066; F25B 2400/04; F25B 30/06; F25B 41/04
USPC ................................. 62/151, 156, 160, 229
See application file for complete search history.

(56) References Cited

U.S. PATENT DOCUMENTS 3,911,693 A * 10/1975 Seigler ................. F24F 1/02
62/151
4,517,807 A * 5/1985 Harnish ................ F24D 17/02
165/241

(Continued)

FOREIGN PATENT DOCUMENTS

CN          1119261 A     3/1996
CN          103174504 A   6/2013
(Continued)

*Primary Examiner* — Henry Crenshaw
(74) *Attorney, Agent, or Firm* — Shumaker, Loop & Kendrick, LLP; James D. Miller

(57) ABSTRACT

A heat pump system for a vehicle, which makes refrigerant bypass an external heat exchanger and turns off a fan mounted on the external heat exchanger when temperature of the outdoor air is lower than setting temperature and the vehicle enters into an idle state in a heat pump mode, thereby continuously operating the heat pump mode even in the below zero temperature so as to keep heating performance, reducing consumption of electrical power without needing to operate an electric heater, and preventing excessive noise of a fan when the vehicle enters into an idle state in the below zero temperature.

20 Claims, 6 Drawing Sheets

(56) References Cited

U.S. PATENT DOCUMENTS

| | | | | |
|---|---|---|---|---|
| 4,688,390 | A | * | 8/1987 | Sawyer ................... F25B 13/00 62/160 |
| 6,378,328 | B1 | * | 4/2002 | Cholkeri ............... F25B 41/062 62/528 |
| 6,430,951 | B1 | * | 8/2002 | Iritani ................ B60H 1/00021 62/160 |
| 2002/0095943 | A1 | * | 7/2002 | Hatakeyama ...... B60H 1/00007 62/324.1 |
| 2006/0123820 | A1 | * | 6/2006 | Kim ........................ F25B 13/00 62/238.7 |
| 2010/0326127 | A1 | * | 12/2010 | Oomura ............. B60H 1/00785 62/498 |
| 2011/0015896 | A1 | * | 1/2011 | Gendron ................ G06F 17/18 702/181 |
| 2013/0227973 | A1 | | 9/2013 | Kang et al. |
| 2013/0298851 | A1 | | 11/2013 | Nishikawa et al. |

FOREIGN PATENT DOCUMENTS

| | | |
|---|---|---|
| CN | 103363603 A | 10/2013 |
| EP | 2497662 A2 | 9/2012 |
| EP | 2636549 A2 | 9/2013 |
| JP | H0842938 A | 2/1996 |
| KR | 1020140001410 A | 1/2014 |

\* cited by examiner

PRIOR ART orifice function
(expansion)

on-off valve function
(nonexpansion)

US 9,834,063 B2

HEAT PUMP SYSTEM FOR VEHICLE

CROSS REFERENCE TO RELATED APPLICATIONS

This application claims priority to Korean Patent Application No. 10-2014-0013371, filed on Feb. 6, 2014, and No. 10-2015-0014746 filed on Jan. 30, 2015, the entire disclosures of which are hereby incorporated herein by reference.

FIELD OF THE INVENTION

The present invention relates to a heat pump system for a vehicle, and more particularly, to a heat pump system for a vehicle, which makes refrigerant bypass an external heat exchanger and turns off a fan mounted on the external heat exchanger when temperature of the outdoor air is lower than setting temperature and the vehicle enters into an idle state in a heat pump mode.

BACKGROUND OF THE INVENTION

In general, an air conditioner for a vehicle includes a cooling system for cooling the interior of the vehicle and a heating system for heating the interior of the vehicle. At an evaporator side of a refrigerant cycle, the cooling system converts air into cold air by heat-exchanging the air passing outside an evaporator with refrigerant flowing inside the evaporator so as to cool the interior of the vehicle. At a heater core side of a cooling water cycle, the heating system converts air into warm air by heat-exchanging the air passing outside the heater core with cooling water flowing inside the heater core so as to heat the interior of the vehicle.

In the meantime, differently from the air conditioner for the vehicle, a heat pump system which can selectively carry out cooling and heating by converting a flow direction of refrigerant using one refrigerant cycle has been applied. For instance, the heat pump system includes two heat exchangers: one being an internal heat exchanger mounted inside an air-conditioning case for heat-exchanging with air blown to the interior of the vehicle; and the other one being an external heat exchanger for heat-exchanging outside the air-conditioning case, and a direction-adjustable valve for changing a flow direction of refrigerant. Therefore, according to the flow direction of the refrigerant by the direction-adjustable valve, the internal heat exchanger serves as a heat exchanger for cooling when the cooling mode is operated, and serves as a heat exchanger for heating when the heating mode is operated.

Various kinds of the heat pump system for the vehicle have been proposed, and FIG. 1 illustrates a representative example of the heat pump system for the vehicle.

As shown in FIG. 1, the heat pump system for the vehicle includes: a compressor 30 for compressing and discharging refrigerant; an internal heat exchanger 32 for radiating heat of the refrigerant discharged from the compressor 30; a first expansion valve 34 and a first bypass valve 36 mounted in parallel for selectively passing the refrigerant passing through the internal heat exchanger 32; an external heat exchanger 48 for heat-exchanging the refrigerant passing through the first expansion valve 34 or the first bypass valve 36 with the outdoor; an evaporator 60 for evaporating the refrigerant passing through the external heat exchanger 48; an accumulator 62 for dividing the refrigerant passing through the evaporator 60 into a gas-phase refrigerant and a liquid-phase refrigerant; an inside heat exchanger 50 for heat-exchanging refrigerant supplied to the evaporator 60 with refrigerant returning to the compressor 30; a second expansion valve 56 for selectively expanding the refrigerant supplied to the evaporator 60; and a second bypass valve 58 mounted in parallel with the second expansion valve 56 for selectively connecting an outlet side of the external heat exchanger 48 and an inlet side of the accumulator 62.

In FIG. 1, the reference numeral 10 designates an air-conditioning case in which the internal heat exchanger 32 and the evaporator 60 are encased, the reference numeral 12 designates a temperature-adjustable door for controlling a mixed amount of cold air and warm air, and the reference numeral 20 designates a blower mounted at an inlet of the air-conditioning case.

According to the heat pump system having the above structure, when a heat pump mode (maximum heating mode) is operated, the first bypass valve 36 and the second expansion valve 56 are closed, and the first expansion valve 34 and the second bypass valve 58 are opened. Moreover, the temperature-adjustable door 12 is operated as shown in FIG. 1. Accordingly, the refrigerant discharged from the compressor 30 passes through the internal heat exchanger 32, the first expansion valve 34, the external heat exchanger 48, a high pressure side 52 of the inside heat exchanger 50, the second bypass valve 58, the accumulator 62, and a low pressure side 54 of the inside heat exchanger 50 in order, and then, is returned to the compressor 30. That is, the internal heat exchanger 32 serves as a heater and the external heat exchanger 48 serves as an evaporator.

When an air-conditioning mode (maximum cooling mode) is operated, the first bypass valve 36 and the second expansion valve 56 are opened, and the first expansion valve 34 and the second bypass valve 58 are closed. Furthermore, the temperature-adjustable door 12 closes a passage of the internal heat exchanger 32. Therefore, the refrigerant discharged from the compressor 30 passes through the internal heat exchanger 32, the first bypass valve 36, the external heat exchanger 48, the high pressure side 52 of the inside heat exchanger 50, the second expansion valve 56, the evaporator 60, the accumulator 62, and the low pressure side 54 of the inside heat exchanger 50 in order, and then, is returned to the compressor 30. In this instance, the internal heat exchanger 32 closed by the temperature-adjustable door 12 serves as a heater in the same with the heat pump mode.

However, in case of the conventional heat pump system for the vehicle, in the heat pump mode, the internal heat exchanger 32 mounted inside the air-conditioning case 10 serves as a heater so as to carry out heating, and the external heat exchanger 48 mounted outside the air-conditioning case 10, namely, at the front side of an engine room of the vehicle, serves as an evaporator which exchanges heat with the outdoor air.

In this instance, if temperature of the external heat exchanger 48 becomes lower than freezing point while the refrigerant introduced into the external heat exchanger 48 exchanges heat, with the outdoor air, frosting is formed on the surface of the external heat exchanger 48.

When frosting on the surface of the external heat exchanger 48 is expanded continuously, the external heat exchanger 48 cannot absorb heat and it causes drop of temperature and pressure of the refrigerant inside the system and drop of temperature of the air discharged to the inside of the vehicle so as to remarkably reduce heating performance, such that it deteriorates stability of the system because liquid refrigerant is induced into the compressor Therefore, the conventional heat pump system for the vehicle is controlled to stop operation when frosting is formed on the external heat exchanger 48 to start operation again when frosting is removed. As described above, because heating performance is deteriorated when the heat pump system stops operation when frosting is formed, an electric heater is operated. Then, consumption of electrical power increases, and it reduces the mileage of electric vehicles or hybrid vehicles.

Moreover, when it snows, snow is accumulated on the external heat exchanger 48, such that the external heat exchanger 48 is stopped. As described above, in the state where snow is accumulated on the external heat exchanger 48, when the vehicle enters into the idle state, excessive noise is generated due to operation of a fan of the external heat exchanger.

SUMMARY OF THE INVENTION

Accordingly, the present invention has been made to solve the above-mentioned problems occurring in the prior art, and it is an object of the present invention to provide a heat pump system for a vehicle, which makes refrigerant bypass an external heat exchanger and turns off a fan mounted on the external heat exchanger when a temperature of the outdoor air is lower than setting temperature and the vehicle enters into an idle state in a heat pump mode, thereby continuously operating the heat pump mode even in the below zero temperature so as to keep heating performance, reducing consumption of electrical power without needing to operate an electric heater, and preventing excessive noise of a fan when the vehicle enters into an idle state in the below zero temperature.

To achieve the above objects, the present invention provides a heat pump system for a vehicle including: a compressor mounted on a refrigerant circulation line for compressing and discharging refrigerant; an internal heat exchanger mounted inside an air-conditioning case for exchanging heat between the air inside the air-conditioning case and the refrigerant discharged from the compressor; an evaporator mounted inside the air-conditioning case for exchanging heat between the air inside the air-conditioning case and the refrigerant supplied to the compressor; an external heat exchanger mounted outside the air-conditioning case for exchanging heat between the refrigerant circulating through the refrigerant circulation line and the outdoor air; first expansion means mounted on the refrigerant circulation line located between the internal heat exchanger and the external heat exchanger to expand refrigerant; and second expansion means mounted on the refrigerant circulation line of an inlet side of the evaporator to expand refrigerant, characterized in that the heat pump system further comprises: on the refrigerant circulation line, a first bypass line which is mounted to connect the refrigerant circulation line of an inlet of the second expansion means and the refrigerant circulation line of an outlet of the evaporator with each other in order to make the refrigerant circulating the refrigerant circulation line bypass the second expansion means and the evaporator, and a second bypass line which is mounted to connect the refrigerant circulation lines of the inlet and the outlet of the external heat exchanger in order to make the refrigerant circulating the refrigerant circulation line bypass the external heat exchanger; and a controller disposed to control the refrigerant circulating the refrigerant circulation line to bypass the external heat exchanger through the second bypass line when temperature of the outdoor air is lower than setting temperature and the vehicle enters into an idle state in a heat pump mode.

According to the present invention, the heat pump system for the vehicle can make refrigerant bypass the external heat exchanger and turn off the fan mounted on the external heat exchanger when the temperature of the outdoor air is lower than setting temperature (0° C.) and the vehicle enters into the idle state in the heat pump mode, thereby preventing excessive noise of the fan when the vehicle enters into the idle state in the below zero temperature.

Furthermore, even in a case that frosting is formed on the external heat exchanger, the heat pump system defrosts the external heat exchanger without stopping the operation of the heat pump system because refrigerant bypasses the external heat exchanger and recovers waste heat of electronic units, thereby maintaining heating performance inside the vehicle. The heat pump system for the vehicle according to the present invention does not need additional supply of heat sources to defrost the external heat exchanger, reduces consumption of electrical power by reducing frequency in use of the electric heater, thereby increasing the mileage of electric vehicles or hybrid vehicles.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF EXEMPLARY EMBODIMENTS OF THE INVENTION

Figure 1:
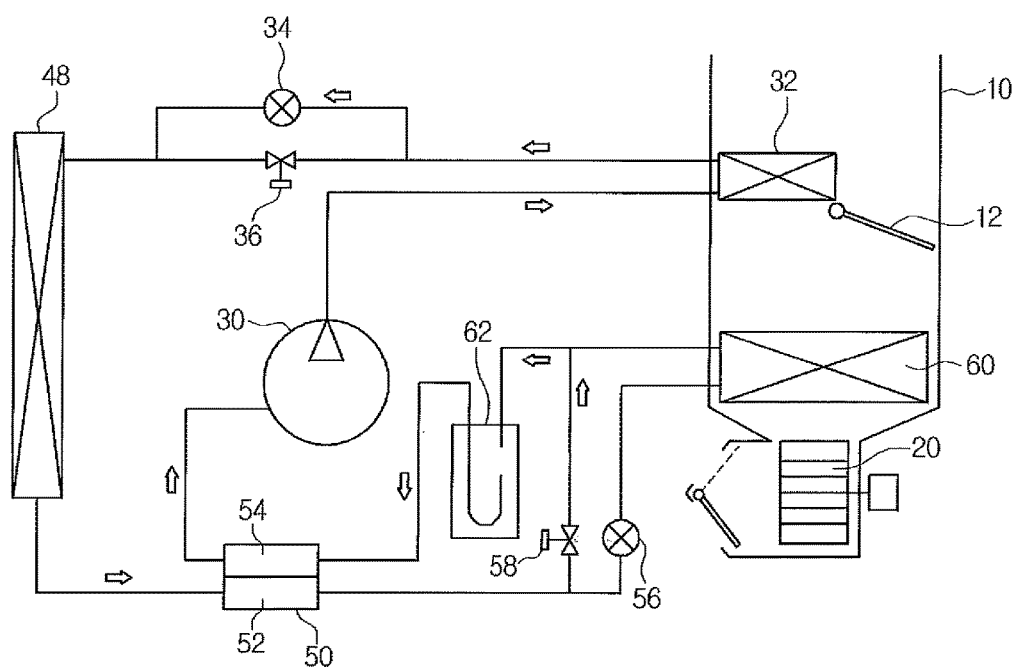
FIG. 1 is a configurative diagram of a conventional heat pump system for a vehicle.

The following detailed description and appended drawings describe and illustrate various embodiments of the invention. The description and drawings serve to enable one skilled in the art to make and use the invention, and are not intended to limit the scope of the invention in any manner.

First, a heat pump system for a vehicle according to the present invention includes a compressor 100, an internal heat exchanger 110, a first expansion means or valve 120, an external heat exchanger 130, a second expansion means or valve 140, and an evaporator 160 which are connected on a refrigerant circulation line (R) in order, and may be applied to electric vehicles or hybrid vehicles.

Moreover, on the refrigerant circulation line (R), a first bypass line (R1) bypassing the second expansion means 140 and the evaporator 160 and a second bypass line (R2)

bypassing the external heat exchanger 130 are connected in parallel. A first direction changing valve 191 is mounted at a branching point of the first bypass line (R1), and a second direction changing valve 192 is mounted at a branching point of the second bypass line (R2).

Figure 2:
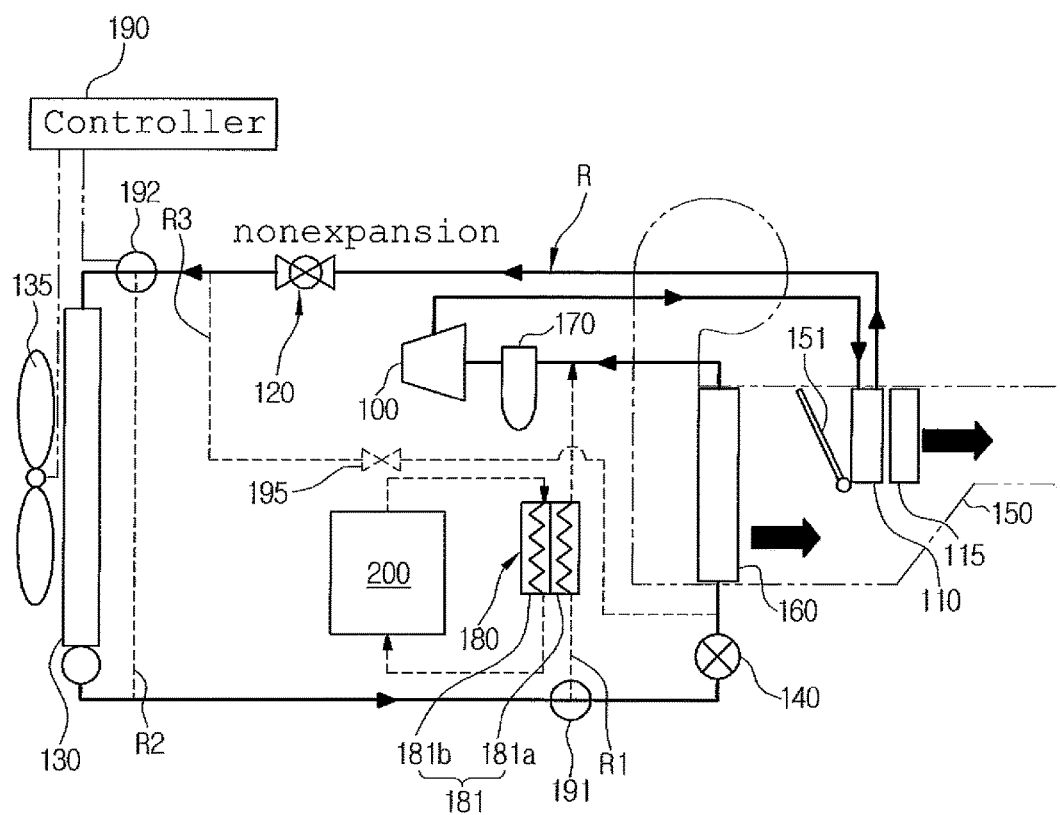
FIG. 2 is a configurative diagram of an air-conditioning mode of a heat pump system for a vehicle according to an embodiment of the present invention.

Therefore, in an air-conditioning mode, as shown in FIG. 2, the refrigerant discharged from the compressor 100 circulates through the internal heat exchanger 110, the external heat exchanger 130, the second expansion means 140, the evaporator 160, and the compressor 100 in order. In this instance, the internal heat exchanger 110 serves as a condenser and the evaporator 160 serves as an evaporator.

Meanwhile, the external heat exchanger 130 also serves as a condenser like the internal heat exchanger 110.

Figure 3:
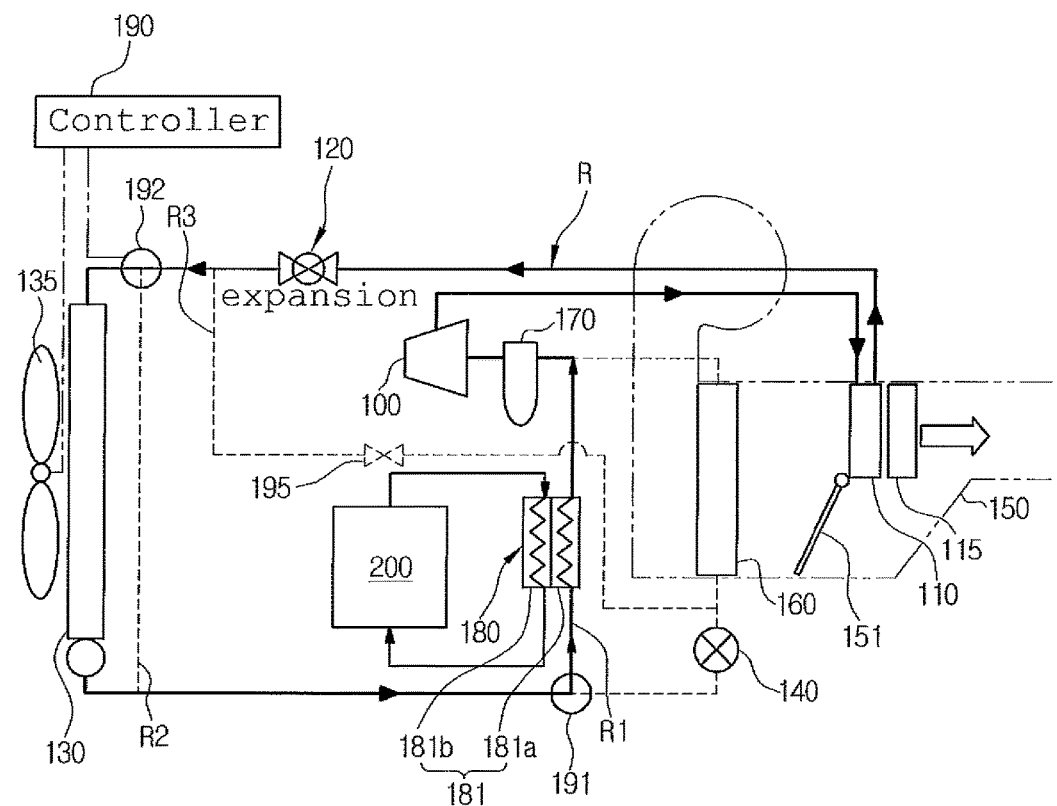
FIG. 3 is a configurative diagram of a heat pump mode of the heat pump system for the vehicle according to the embodiment of the present invention shown in FIG. 2.

In a heat pump mode, as shown in FIG. 3, the refrigerant discharged from the compressor 100 circulates through the internal heat exchanger 110, an orifice 128 of the first expansion means 120, the external heat exchanger 130, the bypass line (R1), and the compressor 100 in order. In this instance, the internal heat exchanger 110 serves as a condenser and the external heat exchanger 130 serves as an evaporator. The refrigerant is not supplied to the second expansion means 140 and the evaporator 160.

In the meantime, when the interior of the vehicle is dehumidified in the heat pump mode, some of the refrigerant circulating in the refrigerant circulation line (R) is supplied to the evaporator 160 through a dehumidification line (R3) which will be described later, such that the interior of the vehicle is dehumidified.

As described above, the heat pump system according to the embodiment of the present invention can commonly use the refrigerant circulation line (R) because the air-conditioning mode and the heat pump mode have the same circulation direction of the refrigerant, prevent stagnation of refrigerant, and simplify the refrigerant circulation line (R).

Hereinafter, components of the heat pump system for the vehicle according to the present invention will be described in detail.

First, the compressor 100 mounted in the refrigerant circulation line (R) inhales and compresses refrigerant while operating by receiving a driving force from an engine (an internal combustion engine) or a motor, and then, discharges the refrigerant in a gas phase of high-temperature and high-pressure.

The compressor 100 inhales and compresses the refrigerant discharged from the evaporator 160 and supplies to the internal heat exchanger 110 in the air-conditioning mode, and inhales and compresses the refrigerant discharged from the external heat exchanger 130 and passing through the first bypass line (R1) and supplies to the internal heat exchanger 110 in the heat pump mode.

Moreover, in the dehumidification mode of the heat pump mode, because refrigerants are simultaneously supplied to the evaporator 160 through the first bypass line (R1) and the dehumidification line (R3), the compressor 100 inhales and compresses the refrigerants meeting after passing through the first bypass line (R1) and the evaporator 160 and supplies the inhaled and compressed refrigerant to the internal heat exchanger 110.

The internal heat exchanger 110 is mounted inside the air-conditioning case 150 and connected with the refrigerant circulation line (R) of the outlet side of the compressor 100 so as to heat-exchange air flowing inside the air-conditioning case 150 with the refrigerant discharged from the compressor 100.

Furthermore, the evaporator 160 is mounted inside the air-conditioning case 150 and connected with the refrigerant circulation line (R) of the inlet side of the compressor 100 so as to heat-exchange the air flowing inside the air-conditioning case 150 with the refrigerant supplied to the compressor 100.

The internal heat exchanger 110 serves as a condenser all in the air-conditioning mode and the heat pump mode.

The evaporator 160 serves as an evaporator in the air-conditioning mode, but is stopped in the heat pump mode because refrigerant is not supplied and serves as an evaporator in the dehumidification mode because some of the refrigerant is supplied.

Moreover, the internal heat exchanger 110 and the evaporator 160 are spaced apart from each other at a predetermined interval inside the air-conditioning case 150, and in this instance, are mounted in order from the upstream side of the air flow direction inside the air-conditioning case 150.

Therefore, in the air-conditioning mode that the evaporator 160 serves as the evaporator, as shown in FIG. 2, the refrigerant of low-temperature and low-pressure discharged from the second expansion means 140 is supplied to the evaporator 160, and in this instance, the air flowing inside the air-conditioning case 150 through the blower (not shown) is converted into cold air by exchanging heat with the refrigerant of low-temperature and low-pressure of the evaporator 160 while passing through the evaporator 160, and then, is discharged to the interior of the vehicle to thereby cool the interior of the vehicle.

In the heat pump mode that the internal heat exchanger 110 serves as a condenser, as shown in FIG. 3, the refrigerant of high-temperature and high-pressure discharged from the compressor 100 is supplied to the internal heat exchanger 110, and in this instance, the air flowing inside the air-conditioning case 150 through the blower (not shown) is converted into warm air by exchanging heat with the refrigerant of high-temperature and high-pressure of the internal heat exchanger 110 while passing through the internal heat exchanger 110, and then, is discharged to the interior of the vehicle to thereby heat the interior of the vehicle.

Moreover, a temperature-adjustable door 151 for adjusting an amount of air bypassing the internal heat exchanger 110 and an amount of air passing through the internal heat exchanger 110 is mounted between the evaporator 160 and the internal heat exchanger 110 inside the air-conditioning case 150.

The temperature-adjustable door 151 adjusts the amount of the air bypassing the internal heat exchanger 110 and the amount of the air passing through the internal heat exchanger 110 to thereby properly control temperature of the air discharged from the air-conditioning case 150.

In this instance, in the air-conditioning mode, as shown in FIG. 2, when a front side passage of the internal heat exchanger 110 is completely closed by the temperature-adjustable door 151, because the cold air passing through the evaporator 160 bypasses the internal heat exchanger 110 and is supplied to the interior of the vehicle, the maximum cooling is carried out. In the heat pump mode, as shown in FIG. 3, when a passage bypassing the internal heat exchanger 110 is completely closed by the temperature-adjustable door 151, because all of the air is converted into warm air while passing through the internal heat exchanger 110 serving as the condenser and the warm air is supplied to the interior of the vehicle, the maximum heating is carried out.

Furthermore, the external heat exchanger 130 is mounted outside the air-conditioning case 150 and connected with the refrigerant circulation line (R) so as to exchange heat between the refrigerant circulating in the refrigerant circulation line (R) and the outdoor air.

Here, the external heat exchanger 130 is mounted at the front side of an engine room of the vehicle to exchange heat between the refrigerant flowing inside the external heat exchanger 130 and the outdoor air.

In the air-conditioning mode, the external heat exchanger 130 serves as a condenser like the internal heat exchanger 110, and in this instance, the refrigerant of high-temperature and high-pressure flowing inside the external heat exchanger 130 is condensed while heat-exchanging with the outdoor air. In the heat pump mode, the external heat exchanger 130 serves as an evaporator differently from the internal heat exchanger 110, and in this instance, refrigerant of low-temperature flowing inside the external heat exchanger 130 is evaporated while heat-exchanging with the outdoor air.

Additionally, a fan 135 which compulsively sends the outdoor air toward the external heat exchanger 130 is mounted at one side of the external heat exchanger 130.

Figure 6:
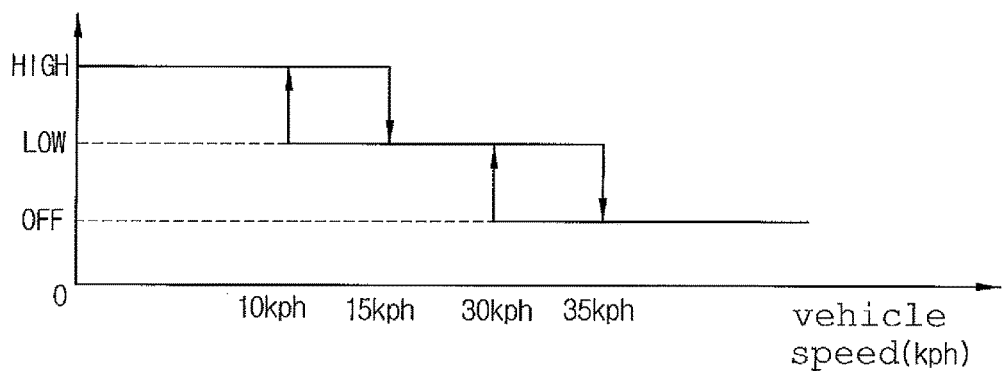
FIG. 6 is a graph showing a stage level of a fan according to a vehicle speed in the heat pump system for the vehicle according to the present invention.

FIG. 6 is a graph showing a stage level of a fan according to a vehicle speed, the heat pump system prevents frequent changes in stage level due to hysteresis when the stage level of the fan 135 is changed due to a change in vehicle speed.

In this instance, the fan 135 is operated at a high stage when the vehicle is in an idle state and when the vehicle speed is within a range from 0 kph to 15 kph, and then, is operated at a low stage within a range from 15 kph to 35 kph, and then, is turned off above 35 kph.

Moreover, in a case that the vehicle speed is reduced, the fan 135 is turned on to the vehicle speed of 30 kph, is operated at a low stage within a range from 10 kph to 30 kph, and then, is operated at a high stage below 101 kph and in the idle state.

Furthermore, the first expansion means 120 is mounted in the refrigerant circulation line (R) between the internal heat exchanger 110 and the external heat exchanger 130 in order to selectively expand the refrigerant supplied to the external heat exchanger 130 according to the air-conditioning mode or the heat pump mode.

The first expansion means 120 includes: an on-off valve 125 mounted in the refrigeration circulation line (R) to turn on or off a flow of the refrigerant; and an orifice 128 mounted integrally with the on-off valve 125 to expand the refrigerant, such that the refrigerant flows in an unexpanded state when the on-off valve 125 is opened but flows in an expanded state through the orifice 128 when the on-off valve 125 is closed.

In other words, the first expansion means 120 integrates the orifice 128 which serves to expand with the on-off valve 125.

Figure 7:
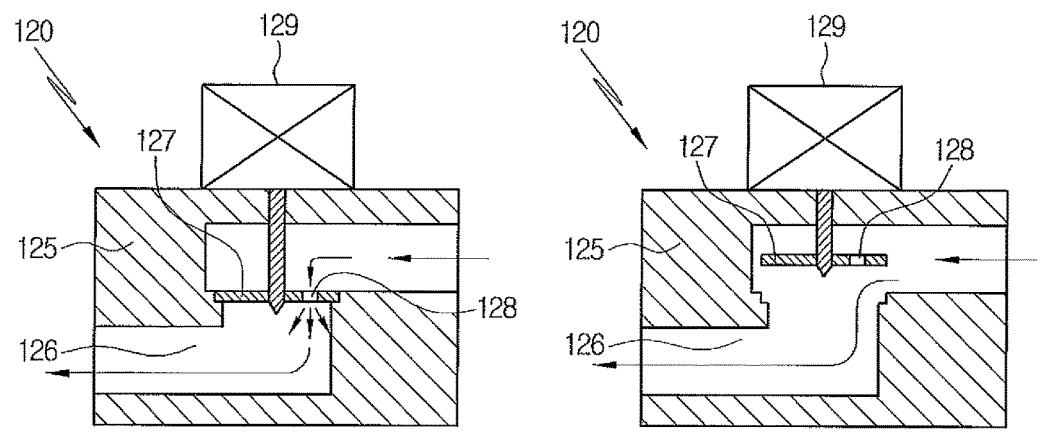
FIG. 7 is a schematic diagram showing an operated state of first expansion means in the heat pump system for the vehicle according to the present invention.

FIG. 7 is a schematic diagram of the first expansion means 120. In FIG. 7, the on-off valve 125 includes a flow path 126 in which the refrigerant flows and a valve member 127 for opening and closing the flow path 126.

In this instance, the orifice 128 is formed on the valve member 127 to expand the refrigerant.

Moreover, a solenoid 129 is mounted at one side of the on-off valve 125 to open and close the valve member 127.

Therefore, when the valve member 127 of the first expansion means 120 opens the flow path 126, the refrigerant passes through the first expansion means 120 without being expanded, but when the valve member 127 of the first expansion means 120 closes the flow path 126, the refrigerant passes through the first expansion means 120 after being expanded while passing through the orifice 128 on the valve member 127.

Additionally, the first bypass line (R1) is mounted in such a way as to connect the refrigerant circulation line (R) of the inlet side of the second expansion means 140 and the refrigerant circulation line (R) of the outlet side of the evaporator 160 with each other, such that the refrigerant circulating through the refrigerant circulation line (R) selectively bypasses the second expansion means 140 and the evaporator 160.

As shown in the drawings, the first bypass line (R1) is arranged in parallel with the second expansion means 140 and the evaporator 160. That is, the inlet side of the first bypass line (R1) is connected with the refrigerant circulation line (R) which connects the external heat exchanger 130 and the second expansion means 140 with each other, and the outlet side is connected with the refrigerant circulation line (R) which connects the evaporator 160 and the compressor 100 with each other.

As a result, in the air-conditioning mode, the refrigerant passing through the external heat exchanger 130 flows toward the second expansion means 140 and the evaporator 160, but, in the heat pump mode, the refrigerant passing through the external heat exchanger 130 directly flows toward the compressor 100 through the first bypass line (R1) and bypasses the second expansion means 140 and the evaporator 160.

Here, the change in flow direction of the refrigerant according to the air-conditioning mode and the heat pump mode is achieved by the first direction changing valve 191.

The first direction changing valve 191 is mounted at a branching point of the first bypass line (R1) and the refrigerant circulation line (R) so as to change the flow direction of the refrigerant in such a manner that the refrigerant passing through the external heat exchanger 130 flows toward the first bypass line (R1) or the second expansion means 140 according to the air-conditioning mode or the heat pump mode.

In this instance, in the air-conditioning mode, the first direction changing valve 191 changes the flow direction of the refrigerant in such a manner that the refrigerant discharged from the compressor 100 and passing through the internal heat exchanger 110 and the external heat exchanger 130 flows toward the second expansion means 140 and the evaporator 160, and in the heat pump mode, the first direction changing valve 191 changes the flow direction of the refrigerant in such a manner that the refrigerant discharged from the compressor 100 and passing through the internal heat exchanger 110, the first expansion means 120 and the external heat exchanger 130 flows toward the first bypass line (R1).

In the meantime, it is preferable that the first direction changing valve 191 is mounted at the branching point of the inlet side of the first bypass line (R1).

A heat supply means 180 for supplying heat to the refrigerant flowing along the first bypass line (R1) is mounted in the first bypass line (R1).

The heat supply means 180 has a water-cooled type heat exchanger 181 including: a refrigerant heat exchange part 181a in which the refrigerant flowing in the first bypass line (R1) flows so as to supply waste heat of electronic units 200 of the vehicle to the refrigerant flowing in the first bypass line (R1); and a cooling water heat exchange part 181b in which cooling water circulating from the electronic units 200 flows, the cooling water heat exchange part 181b being disposed at one side of the refrigerant heat exchange part 181a.

Therefore, in the heat pump mode, the heat pump system can enhance heating performance by recovering a heat source from the waste heat of the electronic units 200 of the vehicle.

In the meantime, there are motors, inverters and others as the electronic units 200 of the vehicle.

Moreover, an accumulator 170 is mounted in the refrigerant circulation line (R) of the inlet side of the compressor 100.

The accumulator 170 divides the refrigerant which is supplied to the compressor 100 into the liquid-phase refrigerant and the gas-phase refrigerant and supplies only the gas-phase refrigerant to the compressor 100.

Moreover, an electric heater 115 for enhancing a heating efficiency is further mounted at the downstream side of the internal heat exchanger 110 and adjacent to the internal heat exchanger 110 inside the air-conditioning case 150.

That is, the heat pump system can enhance heating performance by operating the electric heater 115 at the beginning to start the vehicle as an auxiliary heat source, and can also operate the electric heater 115 when the heat pump system is lacking in the heat source.

In one embodiment, the electric heater 115 is a PTC heater.

In addition, the second bypass line (R2) is mounted in parallel in the refrigerant circulation line (R) in such a manner that the refrigerant selectively passing the first expansion means 120 bypasses the external heat exchanger 130. In other words, the second bypass line (R2) is mounted to connect the refrigerant circulation lines (R) of the inlet and outlet sides of the external heat exchanger 130 so that the refrigerant circulating through the refrigerant circulation line (R) bypasses the external heat exchanger 130.

Moreover, a second direction changing valve 192 for changing a flow direction of the refrigerant is mounted in such a manner that the refrigerant circulating the refrigerant circulation line (R) selectively flows to the second bypass line (R2). The second direction changing valve 192 is mounted at the branching point of the second bypass line (R2) and the refrigerant circulation line (R) so as to change the flow direction of the refrigerant, such that the refrigerant flows toward the external heat exchanger 130 or the second bypass line (R2).

Additionally, a dehumidification line (R3) is mounted in the refrigerant circulation line (R) for supplying some of the refrigerant circulating in the refrigerant circulation line (R) to the evaporator 160 so as to carry out dehumidification of the interior of the vehicle.

The dehumidification line (R3) supplies some of the refrigerant passing the first expansion means 120 to the evaporator 160.

In other words, the dehumidification line (R3) connects the refrigerant circulation line (R) of the outlet side of the first expansion means 120 and the refrigerant circulation line (R) of the inlet side of the evaporator 160 with each other.

In the drawings, the inlet of the dehumidification line (R3) is connected to the refrigerant circulation line (R) between the first expansion means 120 and the external heat exchanger 130, such that some of the refrigerant flows to the dehumidification line (R3) and is supplied to the evaporator 160 before being introduced into the external heat exchanger 130 after passing the first expansion means 120.

Moreover, an on-off valve 195 which opens and closes the dehumidification line (R3) is mounted in the dehumidification line (R3), such that some of the refrigerant passing the first expansion means 120 can flow to the dehumidification line (R3) only in the dehumidification mode.

The on-off valve 195 opens the dehumidification line (R3) only in the dehumidification mode but closes the dehumidification line (R3) far from the dehumidification mode.

In the meantime, an outlet of the dehumidification line (R3) is connected with the refrigerant circulation line (R) of the inlet side of the evaporator 160, such that the refrigerant passing through the dehumidification line (R3) is directly induced into the evaporator 160.

Furthermore, a controller 190 is disposed to control the refrigerant in such a way that the refrigerant which circulates the refrigerant circulation line (R) bypasses the external heat exchanger 130 through the second bypass line (R2) when temperature of the outdoor air is lower than setting temperature and the vehicle enters into the idle state in the heat pump mode.

Additionally, the controller 190 turns off the fan 135 mounted at one side of the external heat exchanger 130 when temperature of the outdoor air is lower than setting temperature and the vehicle enters into the idle state in the heat pump mode.

Here, the setting temperature is below 0° C.

Figure 5:
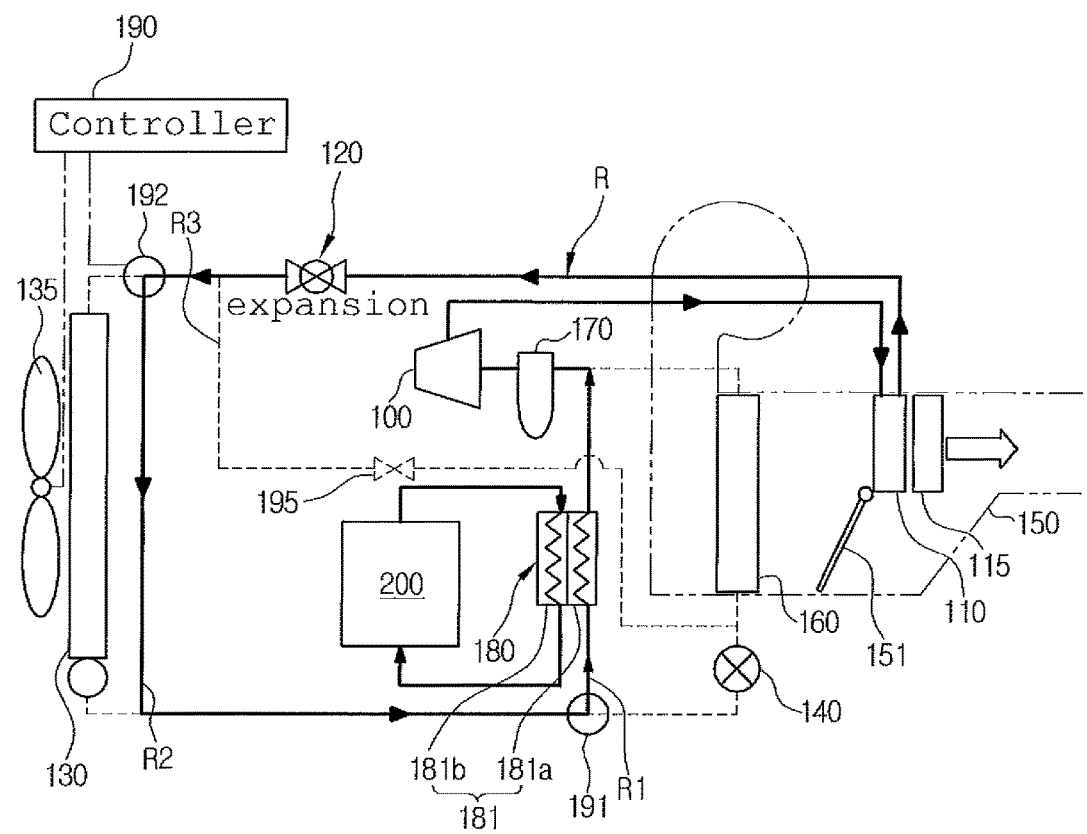
FIG. 5 is a configurative diagram of a dehumidification mode while carrying out the heat pump mode of the heat pump system for the vehicle according to the embodiment of the present invention shown in FIG. 2.

That is, in the heat pump mode, under the condition that temperature of the outdoor air is below 0° C., the controller 190 operates the heat pump mode using the outdoor air by inducing the refrigerant to the external heat exchanger 130 when the vehicle runs, as shown in FIG. 3, and then, blocks the refrigerant induced into the external heat exchanger 130 and makes the refrigerant bypass as shown in FIG. 5, so as to operate the heat pump mode using waste heat of the electronic units 200 and turns off the fan 135 mounted at one side of the external heat exchanger 130 when the vehicle enters into the idle state.

In more detail, under the condition that temperature of the outdoor air is below 0° C., when it is snowing while the vehicle runs, snow is accumulated on the external heat exchanger 130. In this instance, even though snow is accumulated only at a partial area of the external heat exchanger 130, because heat exchange is carried out at the remaining area of the external heat exchanger 130 by vehicle driving wind, the controller 190 determines it as heat exchange, and hence, does not recognize frosting of the external heat exchanger 130, and in this instance, heating performance is normal.

As described above, when the vehicle which runs in the state where snow is accumulated on the external heat exchanger 130 enters into the idle state, because the fan 135 is operated at the high stage in the state where snow is accumulated on the external heat exchanger, excessive noise is generated.

Therefore, in the heat pump mode, under the condition that temperature of the outdoor air is below zero, when the vehicle enters into the idle state, the heat pump system according to the present invention controls the refrigerant to bypass the external heat exchanger 130 and turns off the fan 135, thereby preventing noise by operation of the fan 135 and also preventing noise by operation of the fan 135 even though it is impossible to recognize frosting of the external heat exchanger 130 like the case that snow is accumulated on the external heat exchanger 130.

Meanwhile, when the idle state is released, as shown in FIG. 6, the controller 190 releases the state where the refrigerant circulating the refrigerant circulation line (R) bypasses the external heat exchanger 130, and then, varies the stage level of the fan 135 according to the vehicle speed.

Moreover, in the heat pump mode, when the controller 190 recognizes frosting of the external heat exchanger 130, as shown in FIG. 5, the controller 190 controls the flow of the refrigerant circulating the refrigerant circulation line (R) to circulate the compressor 100, the internal heat exchanger 110, the first expansion means 120, the second bypass line (R2) and the first bypass line (R1) in order so as to carry out defrosting control.

That is, when the refrigerant bypasses the external heat exchanger 130, frosting of the external heat exchanger 130 may be delayed or removed.

In this instance, at the time of defrosting control, the controller 190 turns off the fan 135 mounted at one side of the external heat exchanger 130. That is, the controller 190 can turn off the fan 135 using vehicle driving wind.

In the meantime, recognition of frosting of the external heat exchanger 130 may be achieved through various methods, for instance, if temperature of the refrigerant at the outlet of the external heat exchanger 130 is below zero, the controller 190 recognizes it as frosting of the external heat exchanger 130.

Of course, a sensor may be mounted to recognize frosting of the external heat exchanger 130. In this instance, it is possible to recognize frosting in a case that frost is formed on the surface of the external heat exchanger 130 but it is difficult to recognize frosting in a case that snow is accumulated on the external heat exchanger 130.

Furthermore, when temperature of the outdoor air is lower than the setting temperature and the vehicle enters into the idle state, the controller 190 can delay the control to make the refrigerant circulating the refrigerant circulation line (R) bypass the external heat exchanger 130 for a predetermined period of time.

In other words, when temperature of the outdoor air is lower than the setting temperature and the vehicle enters into the idle state, the controller 190 does not directly carry out the control to make the refrigerant bypass the external heat exchanger 130 but delays it for a predetermined period of time (for instance, for five seconds), and then, carries out bypass control.

In this instance, during the delay time, the refrigerant passes through the external heat exchanger 130, and then, refrigerant remaining in the external heat exchanger 130 circulates the system, such that the system can sufficiently secure refrigerant needed to operate the system.

As described above, even though frosting is formed on the external heat exchanger 130, the heat pump system according to the present invention does not stop operation, and as shown in FIG. 5, makes the refrigerant bypass the external heat exchanger 130 to defrost the external heat exchanger 130 and continuously operate the heat pump mode by recovering waste heat of the electronic units 200 through the heat supply means 180, thereby maintaining heating performance of the inside of the vehicle, defrosting the external heat exchanger 130 without additional supply of heat sources, reducing consumption of electrical power by reducing frequency in use of the electric heater 115, and increasing the mileage of electric vehicles or hybrid vehicles.

Hereinafter, the action of the heat pump system for the vehicle according to the embodiment of the present invention will be described.

A. Air-Conditioning Mode (Cooling Mode) (See FIG. 2)

In the air-conditioning mode (cooling mode), as shown in FIG. 2, the second bypass line (R2) is closed by the second direction changing valve 192, the first bypass line (R1) is also closed by the first direction changing valve 191, and the valve member 127 of the first expansion means 120 opens the flow path 126, such that the refrigerant flows in the unexpanded state.

Moreover, the cooling water circulating through the electronic units 200 is not supplied to the water cooling type heat exchanger 181 of the heat supplying means 180.

Meanwhile, in order to achieve the maximum cooling, the temperature adjustable door 151 inside the air-conditioning case 150 closes the passage passing through the internal heat exchanger 110, so that the air blown into the air-conditioning case 150 by the blower is cooled while passing through the evaporator 160 and is supplied to the interior of the vehicle by bypassing the internal heat exchanger 110 to thereby cool the interior of the vehicle.

Continuously, a refrigerant circulation process will be described.

The gas-phase refrigerant of high-temperature and high-pressure discharged after being compressed in the compressor 100 is supplied to the internal heat exchanger 110 mounted inside the air-conditioning case 150.

As shown in FIG. 2, the refrigerant supplied to the internal heat exchanger 110 directly passes the first expansion means 120 in the unexpanded state and flows to the external heat exchanger 130 without heat-exchanging with the air because the temperature adjustable door 151 closes the passage of the internal heat exchanger 110.

The refrigerant flowing to the external heat exchanger 130 is condensed while heat-exchanging with the outdoor air, and thereby, the gas-phase refrigerant is converted into the liquid-phase refrigerant.

In the meantime, all of the internal heat exchanger 110 and the external heat exchanger 130 serve as the condensers, but the refrigerant is mainly condensed in the external heat exchanger 130 which heat-exchanges with the outdoor air.

Continuously, the refrigerant passing through the external heat exchanger 130 is decompressed and expanded while passing through the second expansion means 140 to thereby become a liquid-phase refrigerant of low-temperature and low-pressure, and then, is introduced into the evaporator 160.

The refrigerant introduced into the evaporator 160 is evaporated by heat-exchanging with the air blown into the air-conditioning case 150 by the blower, and at the same time, cools the air due to a heat absorption by an evaporative latent heat of the refrigerant, and then, the cooled air is supplied to the interior of the vehicle to cool the interior.

After that, the refrigerant discharged from the evaporator 160 is introduced into the compressor 100 and recirculates the above cycle.

B. Heat Pump Mode (See FIG. 3)

In the heat pump mode, as shown in FIG. 3, the second bypass line (R2) is closed by the second direction changing valve 192 and the first bypass line (R1) is opened by the first direction changing valve 191, such that the refrigerant is not supplied to the second expansion means 140 and the evaporator 160.

Moreover, the valve member 127 of the first expansion means 120 closes the flow path 126, such that the refrigerant is expanded while passing the orifice 128.

Meanwhile, the cooling water heated by the electronic units 200 of the vehicle is supplied to the cooling water heat-exchanging part 181*b* of the water cooling type heat exchanger 181 of the heat supplying means 180.

Furthermore, in heating mode, the temperature adjustable door 151 inside the air-conditioning case 150 closes the passage bypassing the internal heat exchanger 110, so that the air blown into the air-conditioning case 150 by the blower is changed into warm air while passing through the internal heat exchanger 110 after passing through the evaporator 160 which is stopped in operation, and then is supplied to the interior of the vehicle to heat the interior of the vehicle.

Continuously, a refrigerant circulation process will be described.

The gas-phase refrigerant of high-temperature and high-pressure discharged after being compressed in the compressor 100 is introduced into the internal heat exchanger 110 mounted inside the air-conditioning case 150.

The gas-phase refrigerant of high-temperature and high-pressure introduced into the internal heat exchanger 110 is condensed while heat-exchanging with the air blown into the air-conditioning case 150 by the blower, and in this instance, the air passing through the internal heat exchanger 110 is converted into warm air and supplied to the interior of the vehicle to thereby heat the interior of the vehicle.

Continuously, the refrigerant discharged from the internal heat exchanger 110 is decompressed and expanded while passing through the orifice 128 of the first expansion means 120 so as to become a liquid-phase refrigerant of low-temperature and low-pressure, and then, is supplied to the external heat exchanger 130 which serves as an evaporator.

The refrigerant supplied to the external heat exchanger 130 is evaporated while heat-exchanging with the outdoor air and passes the first bypass line (R1) by the first direction changing valve 191. In this instance, the refrigerant passing the first bypass line (R1) heat-exchanges with the cooling water passing through the cooling water heat-exchanging part 181b while passing through the refrigerant heat-exchanging part 181a of the water cooling type heat exchanger 181 so as to recover the waste heat of the electronic units 200 of the vehicle, and then, is introduced into the compressor 100 to recirculate the above cycle.

Figure 4:
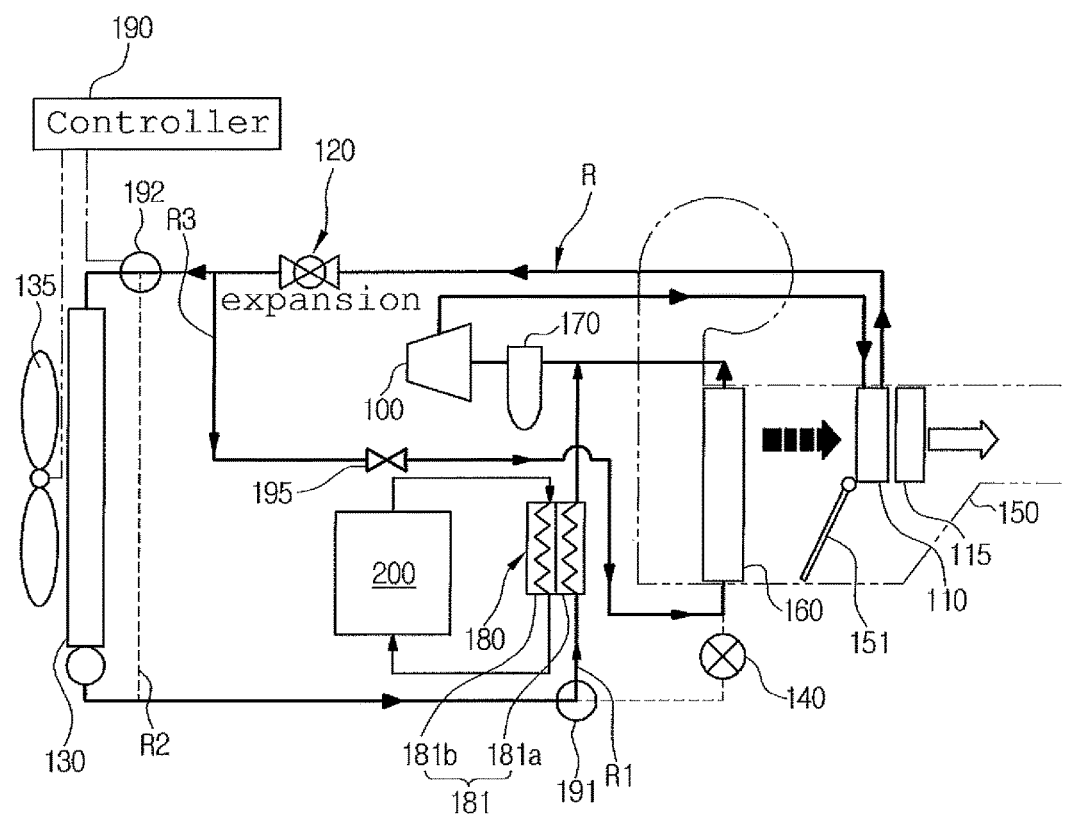
FIG. 4 is a configurative diagram of a defrost mode while carrying out the heat pump mode of the heat pump system for the vehicle according to the embodiment of the present invention shown in FIG. 2.

C. Dehumidification Mode of Heat Pump Mode (See FIG. 4)

The dehumidification mode of the heat pump mode is operated only in the case that dehumidification of the interior of the vehicle is needed while the system is operated in the heat pump mode of FIG. 3.

Therefore, only different parts from the first heating mode of FIG. 3 will be described.

In the dehumidification mode, the dehumidification line (R3) is additionally opened by the on-off valve 195 in the state where the first heating mode is operated.

Moreover, the temperature-adjustable door 151 inside the air-conditioning case 150 closes a passageway bypassing the internal heat exchanger 110. Therefore, air blown into the air-conditioning case 150 by a blower is cooled while passing the evaporator 160, and then, is changed into warm air while passing the internal heat exchanger 110 and is supplied to the interior of the vehicle, such that the heat pump system can heat the interior of the vehicle.

In this instance, because the amount of the refrigerant supplied to the evaporator 160 is small and an air cooling performance is low, it minimizes a change of indoor temperature, such that the heat pump system can smoothly dehumidify the air passing the evaporator 160.

Continuously, a refrigerant circulation process will be described.

Some of the refrigerant passing the compressor 100, the internal heat exchanger 110, and the orifice 128 of the first expansion means 120 passes the external heat exchanger 130, and some of the refrigerant passes the dehumidification line (R3).

The refrigerant passing the external heat exchanger 130 is evaporated while heat-exchanging with the outdoor air, and then, passes the first bypass line (R1) by the first direction changing valve 191. In this instance, the refrigerant passing the first bypass line (R1) heat-exchanges with cooling water passing the cooling water heat exchange part 181b while passing the refrigerant heat exchange part 181a of the water-cooling type heat exchanger 181 so as to be evaporated while recovering waste heat of the electronic units 200 of the vehicle.

The refrigerant passing the dehumidification line (R3) is supplied to the evaporator 160, and is evaporated while heat-exchanging with the air flowing inside the air-conditioning case 150.

In the above process, the air passing the evaporator 160 is dehumidified, and the dehumidified air is changed into warm air while passing the internal heat exchanger 110, and then, is supplied to the interior of the vehicle so as to carry out dehumidification.

After that, the refrigerants respectively passing the water-cooling type heat exchanger 181 and the evaporator 160 meet together and are introduced into the compressor 100, and then, the above-mentioned cycle is re-circulated.

D. Defrosting Mode During Heat Pump Mode (See FIG. 5)

The defrosting mode of the heat pump mode is operated in the case that temperature of the outdoor air is lower than the setting temperature and the vehicle enters into the idle state or in the case that frosting of the external heat exchanger 130 is recognized and defrosting control is needed. In this instance, as shown in FIG. 5, the second bypass line (R2) is opened by the second direction changing valve 192 and the first bypass line (R1) is opened by the first direction changing valve 191.

Additionally, the dehumidification line (R3) is closed by the on-off valve 195 and the refrigerant is expanded through the orifice 128 of the first expansion means 120, such that the heat pump system is converted into an indoor air inflow mode to induce the indoor air into the air-conditioning case 150.

Meanwhile, the cooling water heated by the electronic units 200 of the vehicle is supplied to the cooling water heat-exchanging part 181b of the water cooling type heat exchanger 181 of the heat supplying means 180.

Furthermore, in the defrosting mode, the temperature adjustable door 151 inside the air-conditioning case 150 closes the passage bypassing the internal heat exchanger 110, so that the air blown into the air-conditioning case 150 by the blower is changed into warm air while passing through the internal heat exchanger 110 after passing through the evaporator 160 which is stopped in operation, and then is supplied to the interior of the vehicle to heat the interior of the vehicle.

Continuously, a refrigerant circulation process will be described.

The gas-phase refrigerant of high-temperature and high-pressure discharged after being compressed in the compressor 100 is introduced into the internal heat exchanger 110 mounted inside the air-conditioning case 150.

The gas-phase refrigerant of high-temperature and high-pressure introduced into the internal heat exchanger 110 is condensed while heat-exchanging with the air blown into the air-conditioning case 150 by the blower, and in this instance, the air passing through the internal heat exchanger 110 is converted into warm air and supplied to the interior of the vehicle to thereby heat the interior of the vehicle.

Continuously the refrigerant discharged from the internal heat exchanger 110 is decompressed and expanded while passing through the orifice 128 of the first expansion means 120 so as to become a liquid-phase refrigerant of low-temperature and low-pressure, and then, flows into the second bypass line (R2) to bypass the external heat exchanger 130.

After that, the refrigerant passing the second bypass line (R2) passes through the first bypass line (R1) by the first direction changing valve 191. In this instance, the refrigerant passing the first bypass line (R1) heat-exchanges with the cooling water passing through the cooling water heat-exchanging part 181b while passing through the refrigerant heat-exchanging part 181a of the water cooling type heat exchanger 181 so as to be evaporated while recovering the waste heat of the electronic units 200 of the vehicle, and then, is introduced into the compressor 100 to recirculate the above cycle.

While certain representative embodiments and details have been shown for purposes of illustrating the invention, it will be apparent to those skilled in the art that various changes may be made without departing from the scope of the disclosure, which is further described in the following appended claims.

What is claimed is:

1. A heat pump system for a vehicle comprising:
    a compressor disposed in a refrigerant circulation line for compressing and discharging a refrigerant;
    an internal heat exchanger disposed inside an air-conditioning case exchanging heat between air inside the air-conditioning case and the refrigerant discharged from the compressor;
    an evaporator disposed inside the air-conditioning case exchanging heat between the air inside the air-conditioning case and the refrigerant supplied to the compressor;
    an external heat exchanger disposed outside the air-conditioning case exchanging heat between the refrigerant circulating through the refrigerant circulation line and outdoor air;
    a first expansion means disposed in the refrigerant circulation line between the internal heat exchanger and the external heat exchanger, the first expansion means configured to selectively expand the refrigerant;
    a second expansion means disposed in the refrigerant circulation line on an inlet side of the evaporator;
    a first bypass line connecting the refrigerant circulation line at an inlet side of the second expansion means and the refrigerant circulation line at an outlet side of the evaporator to selectively permit the refrigerant circulating through the refrigerant circulation line to bypass the second expansion means and the evaporator;
    a second bypass line connecting the refrigerant circulation line at an inlet side of the external heat exchanger and an outlet side of the external heat exchanger to selectively permit the refrigerant circulating through the refrigerant circulation line to bypass the external heat exchanger; and
    a controller configured to receive information pertaining to a temperature of the outdoor air and determine when the vehicle enters into an idle state, wherein the controller causes the refrigerant circulating through the refrigerant circulation line to bypass the external heat exchanger and flow through the second bypass line without the controller determining whether or not there is frost formation on the external heat exchanger when the temperature of the outdoor air is lower than a setting temperature, the heat pump system for the vehicle is in a heat pump mode, and the vehicle is in the idle state.

2. The heat pump system according to claim 1, further comprising a fan disposed adjacent the external heat exchanger, wherein the controller powers off the fan when the temperature of the outdoor air is lower than the setting temperature and the vehicle enters into the idle state when in the heat pump mode.

3. The heat pump system according to claim 2, wherein the controller causes the refrigerant to circulate through the refrigerant circulation line and the external heat exchanger when the vehicle is released from the idle state, and then varies a stage level of the fan according to a speed of the vehicle.

4. The heat pump system according to claim 1, wherein in the heat pump mode, when the controller recognizes frosting of the external heat exchanger, the controller causes the refrigerant circulating in the refrigerant circulation line to circulate through the compressor, the internal heat exchanger, the first expansion means, the second bypass line, and the first bypass line in order.

5. The heat pump system according to claim 4, further comprising a fan disposed adjacent the external heat exchanger, wherein the controller powers off the fan when the controller recognizes frosting of the external heat exchanger.

6. The heat pump system according to claim 1, further comprising a heat supply means disposed in the first bypass line to supply heat to the refrigerant flowing through the first bypass line.

7. The heat pump system according to claim 6, wherein the heat supply means is a water cooled type heat exchanger including a refrigerant heat exchange part and a cooling water heat exchange part.

8. The heat pump system according to claim 7, wherein cooling water circulating through the cooling water heat exchange part supplies waste heat from electronic units of the vehicle to the refrigerant circulating through the refrigerant heat exchange part and the first bypass line.

9. The heat pump system according to claim 6, wherein in a defrosting mode during the heat pump mode, the refrigerant circulates through the compressor, the internal heat exchanger, the first expansion means, the second bypass line, and the first bypass line, and the heat supply means in order.

10. The heat pump system according to claim 1, wherein the controller delays bypassing the refrigerant circulating the refrigerant circulation line through the second bypass line around the external heat exchanger for a predetermined period of time when the temperature of the outdoor air is lower than the setting temperature and the vehicle enters into the idle state.

11. The heat pump system according to claim 1, wherein the setting temperature is 0 degrees Celsius.

12. The heat pump system according to claim 1, wherein the first bypass line is arranged in parallel with the second bypass line.

13. The heat pump system according to claim 1, wherein the first bypass line is arranged in parallel with the second expansion means and the evaporator.

14. The heat pump system according to claim 1, wherein the second bypass line is arranged in parallel with the external heat exchanger.

15. The heat pump system according to claim 1, further comprising a dehumidification line connecting the refrigerant circulation line at an outlet side of the first expansion means and the refrigerant circulation line at the inlet side of the evaporator.

16. The heat pump system according to claim 15, wherein the dehumidification line includes an on/off valve disposed therein.

17. The heat pump system according to claim 15, wherein in the heat pump mode with dehumidification, the refrigerant circulates through the compressor, the internal heat exchanger, the first expansion means, and divides with a first portion of the refrigerant circulating through the external heat exchanger and the first bypass line in order and a second portion of the refrigerant circulating through the dehumidification line and the evaporator in order, and wherein the first portion and the second portion rejoin and return to the compressor.

18. The heat pump system according to claim 1, further comprising an electric heater disposed in the air-conditioning case adjacent the internal heat exchanger.

19. The heat pump system according to claim 18, wherein the electric heater is a PTC heater.

20. The heat pump system according to claim 1, wherein the first expansion means is a valve having a solenoid operated valve member disposed therein, wherein the valve member includes an orifice formed therein, and wherein the refrigerant flows in an unexpanded state through the valve when the valve member is in an open position and flows in an expanded state through the orifice when the valve member is in a closed position.

* * * * *